UNITED STATES PATENT OFFICE.

LORENZ ACH AND HERMANN DIETERICH, OF MANNHEIM, GERMANY, ASSIGNORS TO FARBWERKE VORM. MEISTER LUCIUS & BRUENING, OF HÖCHST-ON-THE-MAIN, GERMANY, A FIRM.

PROCESS OF PREPARING DERIVATIVES OF BISMETHYLAMINOTETRAMINOARSENOBENZENE WHICH ARE SOLUBLE IN WATER.

1,265,865.     Specification of Letters Patent.     Patented May 14, 1918.

No Drawing.     Application filed June 15, 1915. Serial No. 34,247.

*To all whom it may concern:*

Be it known that we, LORENZ ACH and HERMANN DIETERICH, citizens of the German Empire, residing at Mannheim, Germany, Sandhoferstr. 112 and Feudenheimer Hauptstr., 114ª, respectively, have invented certain new and useful Improvements in Processes of Preparing Derivatives of Bismethylaminotetraminoarsenobenzene which are Soluble in Water; and we do hereby declare the following to be a full, clear, and exact description of the invention, such as will enable others skilled in the art to which it appertains to make and use the same.

We have found that the derivatives of the bismethylaminotetraminoarsenobenzene substituted in the benzene nucleus, can be transformed into water-soluble compounds by means of an aqueous solution of a bicarbonate of an alkali or of ammonium bicarbonate. By adding a suitable organic solvent, such as alcohol, the said new compounds—which are probably carbaminates—may also be separated in a solid form. Their solutions show an almost neutral reaction, are yellow in color, give a neutral reaction on turmeric paper, and yield carbonic acid, and a derivative of bismethylaminotetraminoarsenobenzene when treated with hydrochloric acid. When stored with exclusion of air, the solutions are eminently stable and, therefore, particularly suitable for therapeutical purposes.

The process of preparing said new compounds consists in treating the said derivatives of the bismethylaminotetraminoarsenobenzene with a bicarbonate, the latter being added or produced in the solution.

The following examples illustrate our invention:

(1.) 63.6 grams of the hydrochlorid of 2.2¹-dichloro-4.4¹-bismethylamino-3.3¹-5.5¹-tetraminoarsenobenzene produced according to U. S. Patent No. 1,180,627 of April 25, 1916, and having the formula:

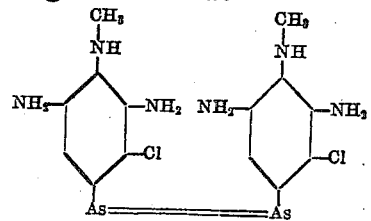

are dissolved in 200 cc. of water and to the solution are added 200 cc. of 2 N-caustic soda lye. The base thus separated is filtered, well washed with water and suspended with exclusion of air (for instance in an atmosphere of carbon dioxid) in a solution of 9.5 g. of sodium bicarbonate in 1000 cc. of water. On shaking this suspension, the base soon dissolves. The yellow solution thus obtained is filtered and stored in flasks filled with carbon dioxid. By adding alcohol a yellowish brown precipitate is obtained.

(2.) 10 g. of 2.2¹.6.6¹-tetrachloro-4.4¹-bismethylamino-3.3¹.5.5¹-tetramino-arsenobenzene hydrochlorid are dissolved in 100 cc. of water and there is gradually added, while shaking, a ½ normal solution of sodium bicarbonate or of ammonium bicarbonate until the base, at first precipitated, is again completely dissolved. For this purpose are required about 235 cc. of the said solution of sodium bicarbonate. The solution thus obtained has a brown color and gives, on adding alcohol, a brown precipitate.

The above mentioned 2.2¹.6.6¹-tetrachlor-4.4¹-bismethylamino-3.3¹.5.5¹-tetramino-arsenobenzene is produced in the following manner: 2.6-dichloro-1.4-diaminobenzene (see *Berichte*, vol. 8 (1875) pages 145/6) are acetylated so as to obtain 1-amino-2.6-dichloro-4-acetylaminobenzene whereupon in the last mentioned compound the arsinic acid residue is substituted for the amino-group by diazotizing and then treating the resultant diazo-compound with sodium arsenite. The 4-acetylamino-2.6-dichlorobenzene arsinic acid thus obtained,—which is insoluble in cold water, readily soluble in hot water, alcohol and alkalis, and does not yet melt at 250° C.—is transformed by saponification by means of a diluted alkali into 4-amino-2.6-dichloro-benzene-arsinic acid (melting at 197° C.). This body is treated with methyl sulfate so as to obtain 4-dimethylamino-2.6-dichlorobenzenearsinic acid, which constitutes a reddish powder, insoluble in diluted acids, cold water, benzene and acetone, soluble in hot alcohol, alkalis and hot glacial acetic acid. By nitrating this acid 4-methylnitramino-3.5-dinitro-2.6-dichlorbenzenearsinic acid is obtained which is a reddish powder, readily soluble in hot alcohol, in a sodium acetate solution and in alkalis, insoluble in diluted acids, cold water and benzene, and which on heating, decomposes at about 200° C. It is transformed by reduction into $4.4^1$-bismethylamino-$3.3^1.5.5^1$-tetramino-$2.2^1.6.6^1$-tetrachloro-arsenobenzene. This compound is precipitated from the aqueous solution of its hydrochlorid by means of alkalis in the form of yellow flakes; it forms a yellow hydrochlorid which is soluble in water, and a sulfate which is insoluble in water, and decomposes on heating.

(3.) 11.1 grams of hydrochlorid of $2.2^1$-dibromo-$4.4^1$-bismethylamino-$3.3^1.5.5^1$-tetramino-arsenobenzene whose method of manufacture is disclosed in Letters Patent of the United States No. 1,180,627 and which has the formula:

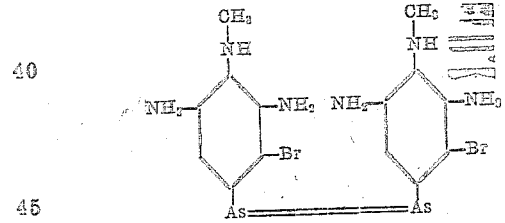

are dissolved in 120 cc. of water and to this solution are added by drops 86 cc. of a ½ normal solution of sodium carbonate. The base, at first precipitated, dissolves and gives a solution of a yellow color; by adding alcohol a precipitate is formed which readily decomposes.

(4.) 10 grams of the hydrochlorid of $2.2^1.4.4^1$-tetramethylamino-$3.3^1.5.5^1$-tetramino-arsenobenzene having the formula:

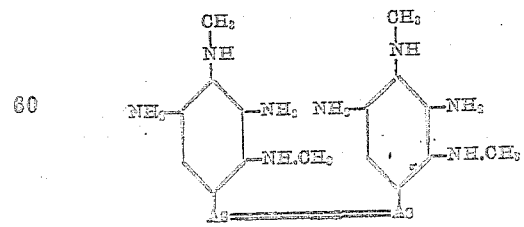

are dissolved in 250 cc. of water and to this solution are added in small portions about 4.1-4.5 g. of sodium carbonate until the reaction is slightly alkaline. By adding alcohol to the solution, which is of a brown color, a brown body separates. When kept in a nitrogen or carbon dioxid atmosphere, the solution is indefinitely stable.

The $2.2^1.4.4^1$-tetramethylamino-$3.3^1.5.5^1$-tetramino-arsenobenzene hydrochlorid can be produced as follows: 4-methylnitramino-$3.5^1$-dinitro-2-chloro-benzene arsinic acid is transformed by treatment with a solution of methylamin into 4-methylnitramino-$3.5^1$-dinitro-2-methylaminobenzene-arsinic acid, a yellow powder, soluble in alcohol, acetone and glacial acetic acid, insoluble in chloroform, ether and benzene and exploding when heated. By reducing this acid by means of tin and hydrochloric acid, and by precipitating with alcohol, the $2.2^1.4.4^1$-tetramethylamino-$3.3^1.5.5^1$-tetramino-arsenobenzene hydrochlorid is obtained in the form of yellow flakes.

Having now described our invention, what we claim is:—

1. The process which consists in dissolving a derivative of $4.4^1$-bismethylamino-$3.5.3^1.5^1$-tetraminoarsenobenzene substituted in the benzene nucleus in water by means of an alkaline bicarbonate.

2. The process which consists in suspending a derivative of $4.4^1$-bismethylamino-$3.5.3^1.5^1$-tetraminoarsenobenzene substituted in the benzene nucleus in water in the presence of an alkaline compound, then introducing into the whole carbon dioxid.

3. The process which consists in dissolving the hydrochlorid of a derivative of $4.4^1$-bismethylamino-$3.5.3^1.5^1$-tetraminoarsenobenzene substituted in the benzene nucleus in water in the presence of an alkaline carbonate.

4. The process which consists in dissolving the hydrochlorid of a derivative of $4.4^1$-bismethylamino-$3.5.3^1.5^1$-tetraminoarsenobenzene substituted in the benzene nucleus in water in the presence of an alkaline-bicarbonate.

5. The process which consists in dissolving $2.2^1$-dichloro-$4.4^1$-bismethylamino-$3.5.3^1.5^1$-tetraminoarsenobenzene in water by means of an alkaline bicarbonate.

6. A solution of a derivative of $4.4^1$-bismethylamino-$3.5.3^1.5^1$-tetraminoarsenobenzene substituted in the benzene nucleus in an aqueous alkaline bicarbonate bath.

7. A solution of the $2.2^1$-dichlor-$4.4^1$-bismethylamino-$3.5.3^1.5^1$-tetraminoarsenobenzene in an aqueous bicarbonate bath.

8. A solution of the $2.2^1$-dichlor-$4.4^1$-bismethylamino-$3.5.3^1.5^1$-tetraminoarsenobenzene in an aqueous alkaline bicarbonate bath.

9. As new products, aqueous solutions of carbaminates derived from 4.4¹-bismethylamino-3.5.3¹.5¹-tetraminoarsenobenzene substituted in the benzene nucleus, being of a yellow color and giving a neutral reaction on turmeric paper, yielding, when treated with hydrochloric acid, carbonic acid and a bismethylamino-tetraminoarsenobenzene substituted in the benzene nucleus, the aqueous solutions yielding on addition of alcohol and ether the carbamate in form of yellow-brownish flakes.

10. As a new product, the aqueous solution of the carbaminate of 2.2¹-dichloro-4.4¹-bismethylamino-3.5.3¹.5¹-tetraminoarsenobenzene, being of a yellow color and giving a neutral reaction on turmeric paper, yielding, when treated with hydrochloric acid, carbonic acid and 2.2¹-dichloro-4.4¹-bismethylamino-3.5.3¹.5¹.-tetraminoarsenobenzene, the aqueous solution yielding on addition of alcohol and ether the carbamate in form of yellow-brownish flakes.

In testimony whereof we hereunto affix our signatures in the presence of two witnesses.

LORENZ ACH.
HERMANN DIETERICH.

Witnesses:
    OTTO HOFMANN,
    C. INNESS BROWN.